W. AND W. R. CHADBURN.
SHIP'S TELEGRAPHIC APPARATUS.
APPLICATION FILED DEC. 10, 1918.
1,307,183.
Patented June 17, 1919.
4 SHEETS—SHEET 1.
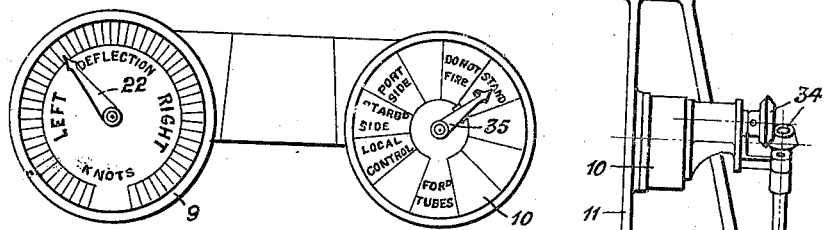
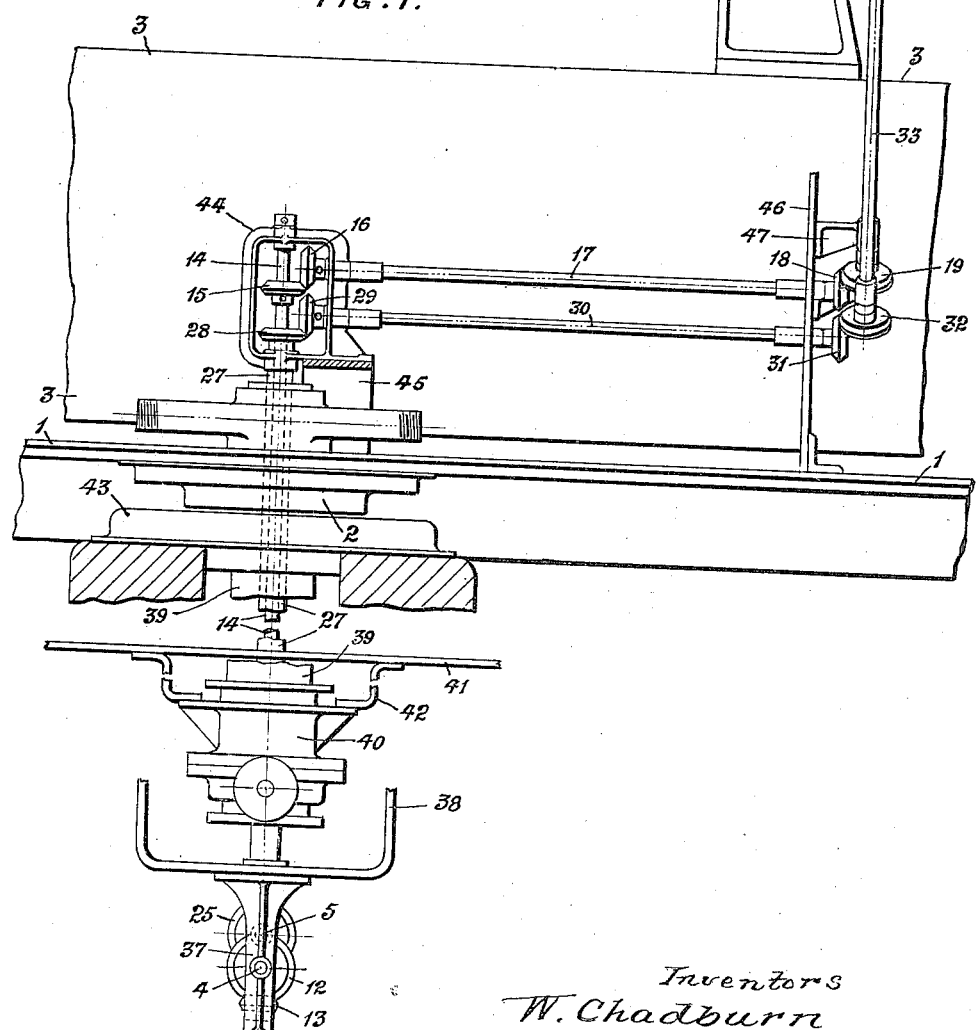
Inventors
W. Chadburn
W. R. Chadburn
by Jno. Imrie
Atty.

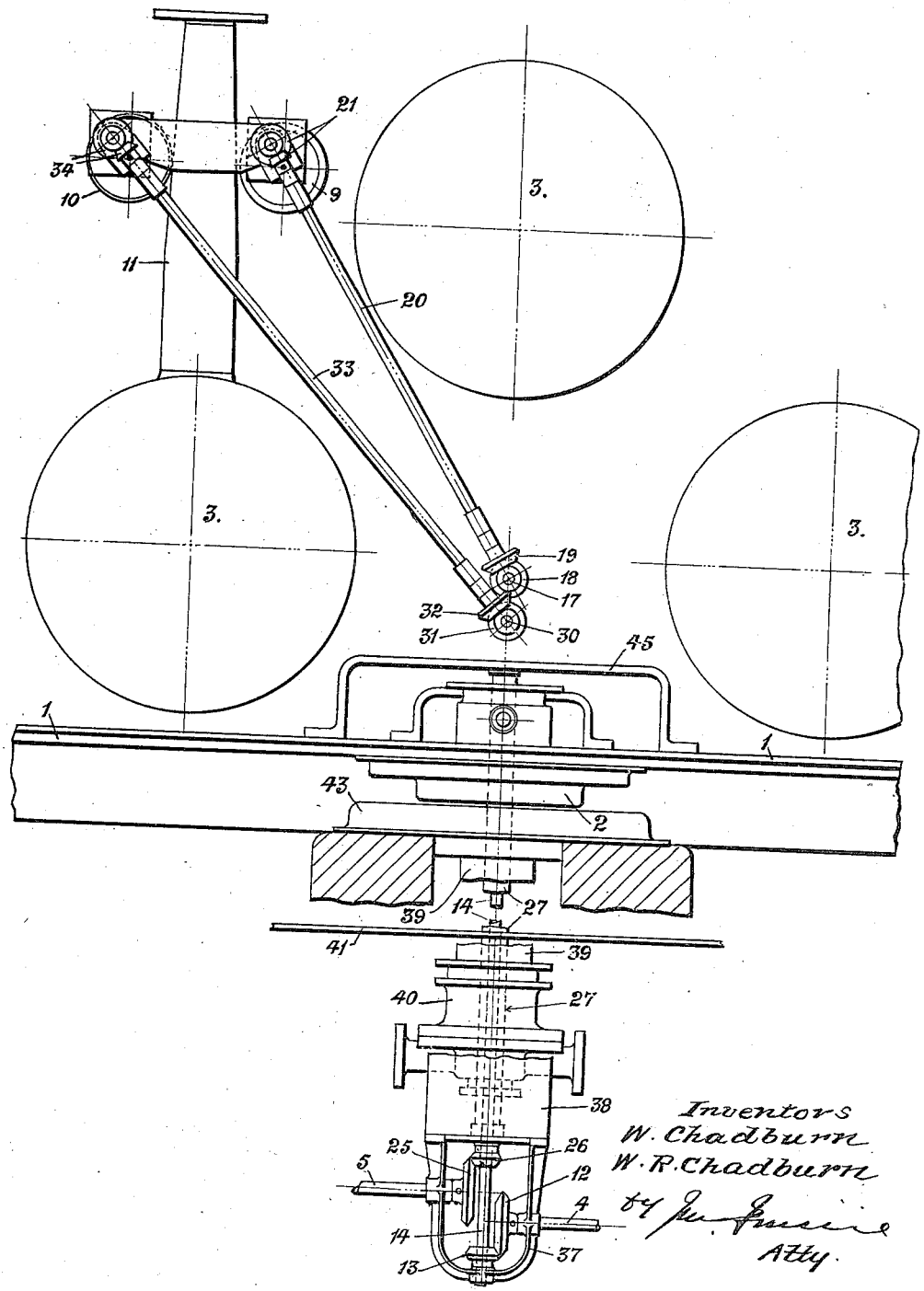

W. AND W. R. CHADBURN.
SHIP'S TELEGRAPHIC APPARATUS.
APPLICATION FILED DEC. 10, 1918.
1,307,183.
Patented June 17, 1919.
4 SHEETS—SHEET 3.
FIG. 4.
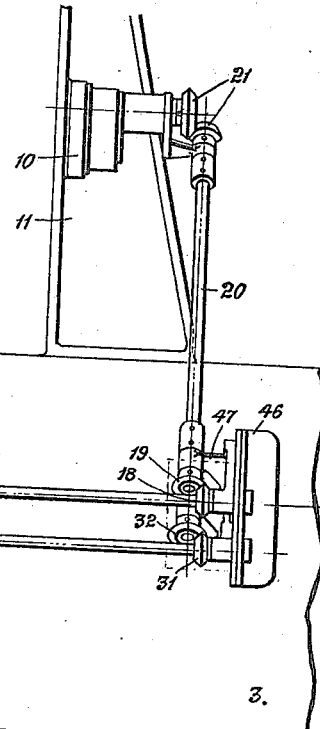
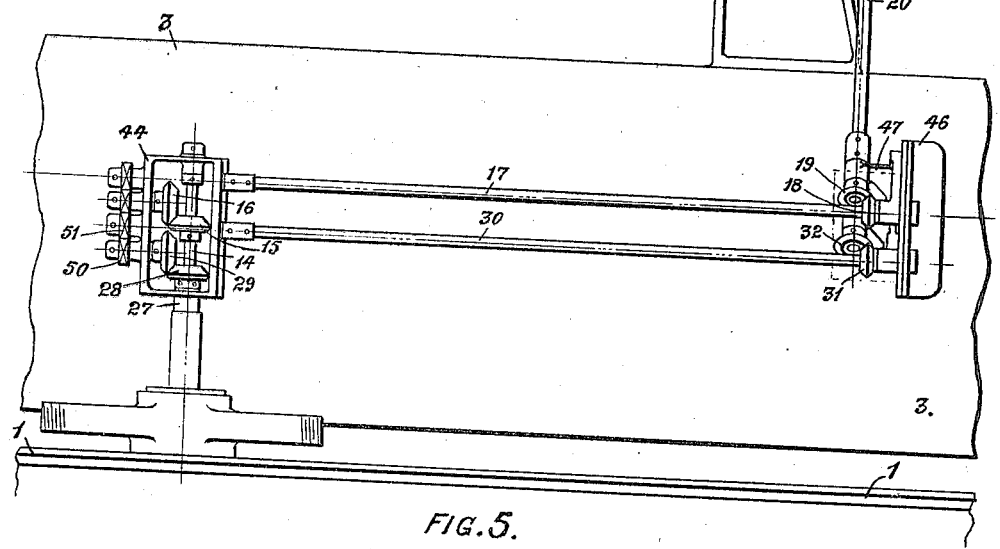
FIG. 5.
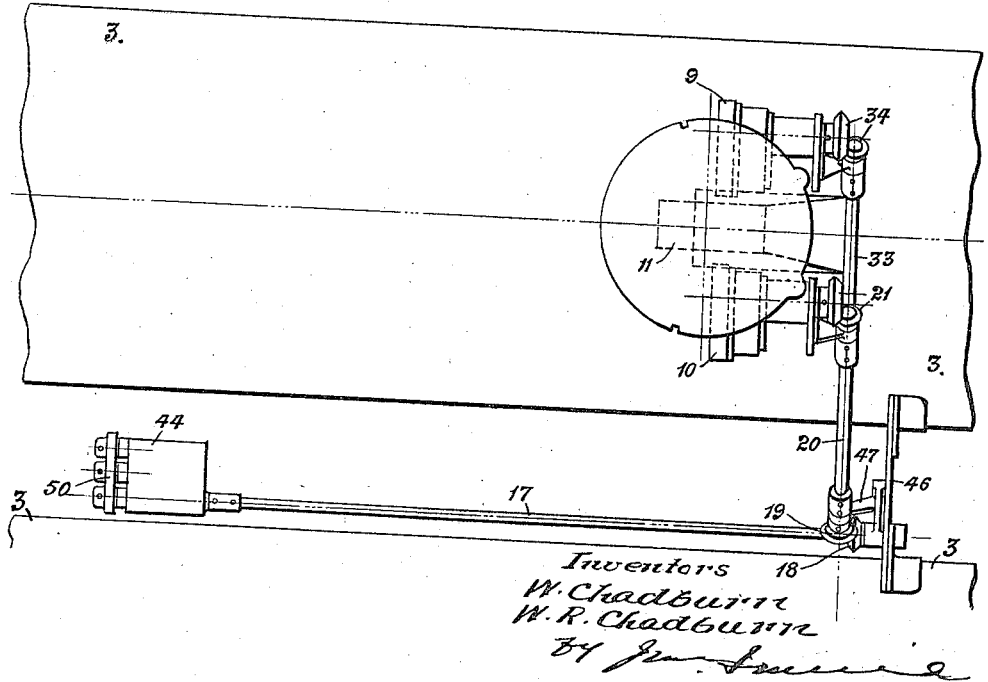
Inventors
W. Chadburn
W. R. Chadburn

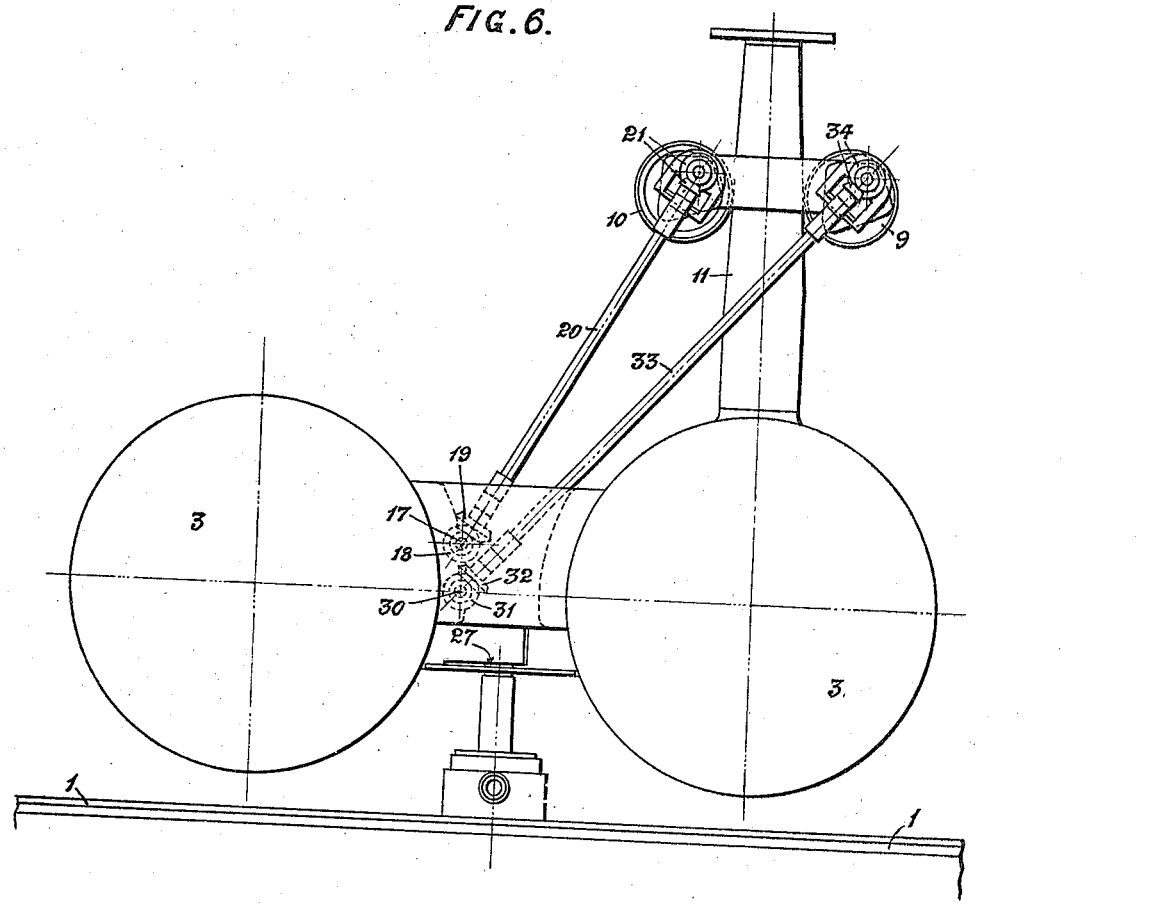

UNITED STATES PATENT OFFICE.

WILLIAM CHADBURN AND WILLIAM ROY CHADBURN, OF BOOTLE, ENGLAND.

SHIP'S TELEGRAPHIC APPARATUS.

1,307,183.  Specification of Letters Patent.  Patented June 17, 1919.

Application filed December 10, 1918. Serial No. 266,090.

*To all whom it may concern:*

Be it known that we, WILLIAM CHADBURN and WILLIAM ROY CHADBURN, subjects of the King of England, residing at Bootle, in the county of Lancaster, England, have invented new and useful Improvements in Ships' Telegraphic Apparatus, of which the following is a specification.

This invention has reference to ships' telegraphic apparatus for communicating between one part of a vessel, in which a hand actuated transmitting instrument or instruments will be disposed, and another place or places, in which a receiving or indicating instrument or instruments will be placed for the transmission and indication of orders, notifications, or communications which is desired to transmit from the one place to the other; and it relates primarily to cases where the receiving instrument is carried on or revolves with a revoluble platform, turn-table, or the like, as in the case of telegraphs of warships where torpedoes are fired from such a revolving turn-table or carrier; and in some cases in such apparatus there have been provided means by which this movement of the pointer or indicating device is obviated, and so that it remains stationary even when the platform or turn-table is moved from one extreme position to another, and this invention has for its object to provide means in connection with this latter type of apparatus.

The invention is described in connection with the accompanying drawings, which illustrate it, and show two modified arrangements of the apparatus.

In the first arrangement, Figure 1 is an elevation showing the arrangement applied to the case where three torpedo tubes are carried on a revolving platform, which also carries the receiving instrument of the ships' telegraphs; and Fig. 2 is an elevation seen at 90° from that seen in Fig. 1.

Fig. 3 is a face view of a pair of telegraphic instruments, shown in rear view in Fig. 2.

Fig. 4, is an elevation illustrating a structure wherein two torpedo tubes are employed.

Fig. 5 is a plan view of the construction, shown in Fig. 4.

Fig. 6, is an end elevation of the same.

Referring now to the drawings, 1 is the turn-table or revolving platform, which is adapted to revolve about a pivot 2 by any known suitable means. 3 are the torpedo tubes which are carried on and revolve with the platform.

There are two telegraphic receiving instruments on the platform 1, the face view of which is shown in Fig. 3, and the back view in Fig. 2, one marked 9 for indicating the deflection orders and one marked 10 for ordinary word orders, such as those marked on the dial in Fig. 3. These instruments are carried on a bracket 11 fixed on the top of one of the torpedo tubes 3.

The shafts from the transmitter instruments which will be in a suitable part of the ship, to the apparatus shown are marked 4 and 5, 4 being that for operating the "deflection" indicator 9, and 5 that for operating the "order" instrument 10.

The motion from the shafting 4 is transmitted to the instruments 9 as follows:

On the shaft 4 is a bevel wheel 12, which meshes with a bevel pinion 13 on a vertical shaft 14 which extends up through the pivot 2, which is hollow, and at its upper part has a bevel pinion 15, which meshes with another bevel pinion 16 on a horizontal shaft 17; and this shaft has on its other end a bevel toothed pinion 8 which meshes with another bevel toothed pinion 19 on the vertical shaft 20, which through bevel gears 21 transmits motion to the instrument 9, and operates the pointer 22 thereof in any known way, which while the turn-table may turn the pointer device of the instruments will not move owing to such turning.

The motion from the shaft 5 is transmitted to the order instrument 10 as follows:

On the shaft 5 is a bevel pinion 25 which meshes with a bevel pinion 26 on a hollow shaft 27 through which the aforesaid shaft 14 passes; and this hollow shaft 27 passes up through the hollow pivot fittings 2, and on its upper end is provided with a bevel toothed wheel 28 which meshes with another bevel wheel 29 on a horizontal shaft 30, which has at its opposite end a toothed bevel wheel 31 meshing with a similar bevel wheel 32 on the shaft 33, which through bevel wheel gearing 34 transmits motion to the pointer 35 of the "order" instrument 10.

The shafts 4, 5, 14 and 27 at the bottom, and their gears 12, 13, 25 and 26, are supported in bearings in a bracket 37 fixed on the plate 38; and the shafts 14 and 27 pass up through the tube 39 which forms the pivot pillar of the revolving platform 1, which is supported in a footstep socket 40 secured to a deck 41 by the bracket 42, and above works in a stationary neck plate 43; and at the upper part these shafts 14, 27 are supported in bearings in the bracket 44, carried on the platform 1 by the plate bracket 45 fixed on it; and in this bracket 44 the shafts 17 and 30 are also supported at one end, while at the other end they are supported in a bracket 46 fixed on the platform, while the shafts 20, 33 are supported at their lower ends by brackets 47 fixed on the bracket 46, and at their upper ends are carried by bearings carried from the back of the instruments 9 and 10.

In this case it will be seen that the two shafts 17 and 30 lie one above the other between two lower torpedo tubes 3, and beneath the upper tube 3; while the instruments 9 and 10 are disposed above one of the lower tubes 3, and to one side of the upper middle tube; and that the connecting shafts 20 and 33 pass between these tubes; the instruments 9 and 10 being supported as stated from a bracket on one of the lower pair of tubes.

The arrangement shown in Figs. 4, 5, and 6 is one in which two torpedo tubes are employed instead of three.

In this case while the general arrangement set forth with reference to and shown in Figs. 1 to 3 also exists, the rods or shafts 17 and 30 are not worked directly from the tooth bevel wheels 15 and 28 mounted respectively on the shafts 14 and 25, but mesh with wheels 16 and 29 mounted on spindles which extend through and are supported by the bracket 44 on one side of it, and have on them outside the bracket 44 a tooth pinion 50, which meshes with another tooth pinion 51 which is in the vertical plane of the shafts 17 and 30; while the axes of the wheels 16 and 29 are in the same vertical plane as the shafts 14 and 25, and motion from the spindles of these wheels 16 and 29 is transferred to the spindles 17 and 30 which pass through the brackets, through pinions thereon, with which the wheels 50 and 51 mesh, so that motion is transferred from one plane in which the spindles 14 and 25 lie to the vertical plane in which the shafts 17 and 30 lie.

By this arrangement, the space between the torpedo tubes in which it is required that a man should be able to move is provided, as the shafts 17 and 30 lie closely against one of the tubes, and out of the way.

It is to be noted that all the portions or parts in the arrangement shown in Figs. 4 to 6 which correspond with those which exist in the arrangement set forth in connection with Figs. 1 and 3, are marked with the same figures of reference.

What is claimed is:—

1. In a ship's telegraphic apparatus, a horizontally rotatable table having a vertical hollow pivot, a vertical tubular shaft rotatable in the vertical hollow pivot, a vertical inner shaft extending within the tubular shaft and projecting above the upper end thereof, means connected with the lower end of the tubular shaft to turn it, means connected with the lower end of the inner shaft to turn it, an open frame secured to the table and provided with a lower vertical bearing receiving the upper end of the tubular shaft and an upper vertical bearing receiving the upper end of the inner shaft, a pair of substantially horizontal shafts arranged above the table in substantially parallel relation, a pair of horizontal bearings carried by the frame to receive the horizontal shafts, driving means between one horizontal shaft and the tubular bearing, driving means between the other horizontal shaft and the inner vertical shaft, and a pair of telegraphic receiving instruments having connection with the horizontal shafts.

2. In a ship's telegraphic apparatus, a horizontally rotatable table having a vertical hollow pivot, a vertical tubular shaft rotatable in the vertical hollow pivot, a vertical inner shaft rotatable within the tubular shaft and projecting above and below the same for a substantial distance, open frames arranged at the upper and lower ends of the tubular shaft and having inner bearings to receive the tubular shaft and outer bearings to receive the ends of the inner shaft, said frames also having horizontal bearings, bevel gears secured to the upper and lower ends of the tubular shaft, bevel gears secured to the upper and lower ends of the inner shaft, lower horizontal shafts arranged near the lower end of the tubular shaft and journaled through the horizontal bearings of the lower open frame, bevel gears carried by the lower horizontal shafts and engaging the bevel gears carried by the lower ends of the tubular shaft and inner shaft, upper horizontal shafts arranged near the upper end of the tubular shaft and journaled through the horizontal bearings of the upper open frame, bevel gears carried by the upper horizontal shafts and engaging the bevel gears secured to the upper ends of the tubular shaft and the inner shaft, and telegraphic receiving instruments connected with the upper horizontal shafts.

In testimony whereof we have signed our names to this specification in the presence of two subscribing witnesses.

WILLIAM CHADBURN.
WILLIAM ROY CHADBURN.

Witnesses to the signature of William Chadburn:
 EVA BLAUSE BRAUR,
 MURIEL KNIGHT.

Witnesses to the signature of William Roy Chadburn:
 C. S. PETERSON,
 H. JOHNSTONE.

Copies of this patent may be obtained for five cents each, by addressing the "Commissioner of Patents, Washington, D. C."